(12) United States Patent
Hashimoto et al.

(10) Patent No.: US 8,387,010 B2
(45) Date of Patent: Feb. 26, 2013

(54) AUTOMATIC SOFTWARE CONFIGURING SYSTEM

(75) Inventors: Kouji Hashimoto, Hitachinaka (JP);
Fumio Narisawa, Hitachinaka (JP);
Kentaro Yoshimura, Hitachi (JP);
Yuichiro Morita, Hitachi (JP);
Nobuhisa Motoyama, Hitachinaka (JP);
Junji Miyake, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 985 days.

(21) Appl. No.: 12/388,081

(22) Filed: Feb. 18, 2009

(65) Prior Publication Data
US 2009/0217243 A1    Aug. 27, 2009

(30) Foreign Application Priority Data
Feb. 26, 2008    (JP) ................. 2008-043704

(51) Int. Cl.
*G06F 9/44*    (2006.01)
(52) U.S. Cl. .............. 717/120; 717/101; 717/121
(58) Field of Classification Search .............. None
See application file for complete search history.

(56) References Cited

U.S. PATENT DOCUMENTS

| | | | | |
|---|---|---|---|---|
| 6,678,882 B1* | 1/2004 | Hurley et al. | ............. | 717/121 |
| 7,003,534 B2* | 2/2006 | Peng | ............. | 707/758 |
| 7,562,307 B2* | 7/2009 | Betts et al. | ............. | 715/762 |
| 7,849,442 B2* | 12/2010 | Hashizume et al. | ............. | 717/121 |
| 2002/0100017 A1* | 7/2002 | Grier et al. | ............. | 717/120 |
| 2002/0104067 A1* | 8/2002 | Green et al. | ............. | 717/101 |
| 2003/0016242 A1* | 1/2003 | Ramahefarivony et al. | .. | 345/738 |
| 2004/0006761 A1* | 1/2004 | Anand et al. | ............. | 717/101 |
| 2005/0022115 A1* | 1/2005 | Baumgartner et al. | ....... | 715/513 |
| 2005/0108630 A1* | 5/2005 | Wasson et al. | ............. | 715/513 |

(Continued)

FOREIGN PATENT DOCUMENTS

| JP | 2006-171898 A | 6/2006 |
|---|---|---|
| JP | 2007-102380 A | 4/2007 |

OTHER PUBLICATIONS

John A. Scott, Software Configuration Management, Lawrence Livermore National Laboratory, 2001, pp. 2-8.*

(Continued)

*Primary Examiner* — Thuy Dao
*Assistant Examiner* — Mongbao Nguyen
(74) *Attorney, Agent, or Firm* — Crowell & Moring LLP

(57) ABSTRACT

An automatic software configuring system includes a database storage section for storing therein a plurality of soft components. In the event that soft components are extracted from the database storage section and are combined together to thereby generate a file, a comment indicative of a storage location in the database storage section for storing a respective soft component extracted from the database storage section is added to the respective soft component. The automatic software configuring system further includes a device for identifying the respective soft component combined into the file and a storage location of the respective soft component by reading the comment; a device for identifying a comparison-target soft component stored in the database storage section; a device for identifying a soft component having a different content; and a device for replacing specified soft component in the database storage section with the soft component combined into the file.

9 Claims, 16 Drawing Sheets

U.S. PATENT DOCUMENTS

| | | | |
|---|---|---|---|
| 2005/0278700 A1* | 12/2005 | Buskens et al. | 717/120 |
| 2006/0026567 A1* | 2/2006 | McVoy et al. | 717/120 |
| 2006/0058992 A1* | 3/2006 | Hashizume et al. | 703/22 |
| 2006/0101398 A1* | 5/2006 | Schepers et al. | 717/120 |
| 2006/0242626 A1* | 10/2006 | Pham et al. | 717/121 |
| 2007/0234319 A1* | 10/2007 | Matsutsuka et al. | 717/140 |
| 2009/0018879 A1* | 1/2009 | Flaxer et al. | 705/7 |
| 2009/0125874 A1* | 5/2009 | Abdelhadi et al. | 717/101 |
| 2009/0144701 A1* | 6/2009 | Faus | 717/121 |

OTHER PUBLICATIONS

Mark C. Chu-Carroll, Supporting Aggregation in Fine Grained Software Configuration Management, 2002, pp. 100-105.*

Simon Schubiger-Banz, Automatic Software Configuration, A Model for Service Provisioning in Dynamic and Heterogeneous Environments, 2002, pp. 7-11 and 32-44.*

* cited by examiner

FIG.4

```xml
<Group name="MicrowaveOven">              ——400
    <src>      ——401
        <File path="/src/include/MicrowaveOven.h" />
    </src>
    <subGroups>
        <Group name="Sensors">    ——402
            <subGroups>
                <Group name="WeightSensor cardinality="1..1">——403    404
                    <src>
                        <File name="Weight.h" patb="/src/Sensors/Weight/Weight.h" />
                    </src>
                    <features>
                        <Feature name="BooleanWeight>——405             406
                            <src>
                                <Text name="initWeight" path="/src/Sensors/Weight/Weight.c">
void initWeight() {
   int ret = initDI();
   if (ret != OK) {
                 :
} int initDI() {
                 :                                                     407
}
</text>
                                <Text name="getWeight" path="/src/Sensors/Weight/Weight.c">
int getWeight() {
                 :
}
</text>
                            </src>
                        </Feature>
                        <Feature name="AnalogWeight>——408              409
                            <src>
                                <Text name="initWeight" path="/src/Sensors/Weight/Weight.c">
```
```
┌─────────────────────────────────────┐
│ void initWeight() {                 │
│    int ret = initADC():             │
│    if (ret != OK) {                 │
│                 :                   │
│ }                                   │
│                                     ├──420
│ int initADC() {                     │
│                 :                   │
│ }                                   │
└─────────────────────────────────────┘
</text>                                                                410
                                <Text name="getWeight" path="/src/Sensors/Weight/Weight.c">
┌─────────────────────────────────────┐
│ int getWeight() {                   │
│                 :                   ├──421
│ }                                   │
└─────────────────────────────────────┘
</text>
                            </src>
                        </Feature>
```

FIG. 5

| NODE ID | Type | Cardinality | PARENT NODE |
|---|---|---|---|
| MicrowaveOven | Group | - | - |
| Sensors | Group | 1..1 | MicrowaveOven |
| Actuators | Group | 0..* | MicrowaveOven |
| WeightSensor | Group | - | Sensors |
| StartButton | Feature | - | Sensors |
| Beeper | Feature | - | Actuators |
| Light | Feature | - | Actuators |
| BooleanWeight | Feature | - | WeightSensor |
| AnalogWeight | Feature | - | WeightSensor |

| SOFT COMPONENT ID | Path | Contents | PARENT NODE |
|---|---|---|---|
| : | : | : | : |
| BooleanWeight /initWeight | /src/Sensors/ Weight/Weight.c | void initWeight(){ int ret=initDI(); if(ret!=OK){ : } int initDI(){ : } | BooleanWeight |
| BooleanWeight /getWeight | /src/Sensors/ Weight/Weight.c | int getWeight(){ : } | BooleanWeight |
| AnalogWeight/ initWeight | /src/Sensors/ Weight/Weight.c | void initWeight(){ int ret=initADC(); : | AnalogWeight |
| AnalogWeight/ getWeight | /src/Sensors/ Weight/Weight.c | | AnalogWeight |
| : | : | | : |

FIG.6

```
#include <include/MicrowaveOven.h>
#include "Weight.h"

$initWeight $getWeight
```

FIG. 7

```
#include <include/MicrowaveOven.h>                701
#incluce "Weight.h"
```

```
/*
@begin(path='/Group/subGroups/Group[name="Sensors"]/subGroups    ──711
/Group[name="WeightSensor"]/features/Feature[name="AnalogWeig
ht"/src/Text[name="initWeight"] ' )
*/
```

```
void initWeight() {
    int ret = initADC();
    if (ret != OK) {                                              ──712
        :
} int initADC() {
    :
}
```

```
/* @end */                                                        ──713
```

702

```
/*
@begin(path='/Group/subGroups/Group[name="Sensors"]/subGroups    ──721
/Group[name="WeightSensor"]/features/Feature[name="AnalogWeig
ht"/src/Text[name="getWeight"] ' )
*/
```

```
void getWeight() {
    :                                                             ──722
}
```

```
/* @end */                                                        ──723
```

FIG.8

```
#include <include/MicrowaveOven.h>
#include "Weight.h"
```
                                                                        811

`/* @begin(id='AnalogWeight/initWeight') */`

```
void initWeight() {
    int ret = initADC();
    if (ret != OK) {
            :
} int initADC() {
            :
}

/* @end */
```
                                                                        821

`/* @begin(id='AnalogWeight/getWeight') */`

```
void getWeight() {
            :
}
/* @end */
```

FIG. 9

```
#include <include/MicrowaveOven.h>                              901
#incluce "Weight.h"
```

```
/*
@begin(path='/Group/subGroups/Group[name="Sensors"]/subGroups
/Group[name="WeightSensor"]/features/Feature[name="AnalogWeig      911
ht"/src/Text[name="initWeight"] ' )
*/
```

```
void initWeight() {
    int ret = initSMW();
    if (ret != OK) {
        :
    }
} int initSMW() {
    :
}
```
(912)

```
/* @end */
```
(913)

902

```
/*
@begin(path='/Group/subGroups/Group[name="Sensors"]/subGroups
/Group[name="WeightSensor"]/features/Feature[name="AnalogWeig      921
ht"/src/Text[name="getWeight"] ' )
*/
```

```
void getWeight() {
    :
}
```
(922)

```
/* @end */
```
(923)

FIG. 14

```
#include <include/MicrowaveOven.h>                    1401
#incluce "Weight.h"
```

```
/*
@begin(path='/Group/subGroups/Group[name="Sensors"]/subGroups
/Group[name="WeightSensor"]/features/Feature[name="DigitalWei
ght"/src/Text[name="initWeight"] ' )
*/
```
— 1411

```
void initWeight() {
    int ret = initSMW();
    if (ret != OK) {
            :

}
} int initSMW() {
            :

}
```
— 1412

```
/* @end */
```
— 1413

1402

```
/*
@begin(path='/Group/subGroups/Group[name="Sensors"]/subGroups
/Group[name="WeightSensor"]/features/Feature[name="DigitalWei
ght"/src/Text[name="getWeight"] ' )
*/
```
— 1421

```
void getWeight() {

:

}
```
— 1422

```
/* @end */
```
— 1423

FIG.16

```
#include <include/MicrowaveOven.h>
#incluce "Weight.h"
```

```
/*
@begin(path='/Group/subGroups/Group[name="Sensors"]/subGroups
/Group[name="WeightSensor"]/features/Feature[name="AnalogWeig
ht"/src/Text[name="InitWeight"] ' )
```
——1611

```
@replace
```
——1620
```
*/
```

```
void initWeight() {
    int ret = initADC();
    if (ret != OK) {
            :

} int initADC() {
            :
}
```
——1612

```
/* @end */
```

```
/*
@begin(path='/Group/subGroups/Group[name="Sensors"]/subGroups
/Group[name="WeightSensor"]/features/Feature[name="AnalogWeig
ht"/src/Text[name="getWeight"] ' )
*/ void getWeight() {

:

}

/* @end */
```

FIG.17

```
#include <include/MicrowaveOven.h>                 1711
#incluce "Weight.h"

/*
@begin(path='/Group/subGroups/Group[name="Sensors"]/subGroups
/Group[name="WeightSensor"]/features/Feature[name="AnalogWeig
ht"/src/Text[name="initWeight"] ' )

@add(path=
='/Group/subGroups/Group[name="Sensors"]/subGroups/Group[name
="WeightSensor"]/features/Feature[name="DigitalWeight"/src/Te
xt[name="initWeight"] ' )
*/                                                  1720 void initWeight() {
    int ret = initADC();
    if (ret != OK) {
        :
    }
} int initADC() {
    :
}                                                   1712

/* @end */

/*
@begin(path='/Group/subGroups/Group[name="Sensors"]/subGroups
/Group[name="WeightSensor"]/features/Feature[name="AnalogWeig
ht"/src/Text[name="getWeight"] ' )
*/ void getWeight() {

:

}

/* @end */
```

AUTOMATIC SOFTWARE CONFIGURING SYSTEM

BACKGROUND OF THE INVENTION

1. Field of the Invention

The present invention relates to an automatic software configuring system that extracts multiple software components from a software component database storing therein existing software components and that combines the extracted software components, thereby to automatically generate a source code of a new computer program.

2. Description of the Related Art

Conventionally, software development has been carried out in such a manner that existing software components (each of which hereinbelow will be referred to as a "soft component") are combined together to thereby develop a new software product, thereby to accomplish development cost reduction therefor. Further, a manner is under study in which proven soft components are selected for existing soft components, and the soft components are combined to develop a new soft component and to maintain their quality.

As a related example, Japanese Unexamined Patent Application Publication No. 2006-171898 discloses a technique with the provision of an automatic software configuring system. According to the disclosed system, in the multiple soft components are extracted from a soft component database preliminarily storing therein existing soft components, and the extracted soft components are combined together, thereby to automatically generate a source code of a new computer program (simply a "program," herebelow).

However, various cases can occur with such a soft component database as described below. For example, a case can take place in which a bug is detected in a soft component stored in the soft component database, and the hence the soft component containing the bug is replaced with a bug-corrected soft component, and a new soft component is added to the soft component database. In such a case, a maintenance operation of the soft component database has to be carried out. In particular, the number of soft components stored in the soft component database is large, it is important to facilitate the maintenance operation.

Hence, Japanese Unexamined Patent Application Publication No. 2007-102380 discloses a technique for a method that automates replacement of a soft component containing a bug with a bug-corrected soft component for a soft component database that manages multiple soft components by using macro descriptions.

SUMMARY OF THE INVENTION

However, while the conventional technique can be applied only to the soft component database that manages multiple soft components by using macro descriptions, the technique cannot be applied to soft component databases that manage soft components by using other methods. Further, in the conventional technique, a practical method for adding a new soft component is not studied.

According to the management method using the macro descriptions, even in the case of those not to be used in the program, all soft components are included into the source code of the new program automatically generated by the automatic software configuring system. Hence, there arises a problem in that the readability of the source code is low. On the other hand, however, since all the soft components are included into the automatically generated source code, in the case where a change is added to the source code, the method enables it to easily identify that the change is added to which one corresponding to the soft components stored in the soft component database.

As described above, in the case of the management method using the macro descriptions, the readability of the automatically generated source code is low. Hence, automatic software configuring systems of the type that automatically generates a source code of a new program by combining only necessary soft components are popularly used. However, unlike the management method using the macro descriptions, in the case where a change is made to the automatically generated source code, it is difficult to identify the soft component to which the change has been made and to identify a storage location of the corresponding soft component in the soft component database. It is especially difficult to identify such things in the case where the number of soft components is increased.

An object of the present invention is to provide an automatic software configuring system that generates a new program by extracting only necessary soft components from a software component database and combining the extracted soft components. In this case, even when the number of soft components stored in the soft component database is increased, maintenance operations, such as software component replacement and addition operations, for the soft component database can be securely and easily implemented.

In order to achieve the object described above, according to one aspect of the present invention, there is provided an automatic software configuring system including a database storage section for storing therein a plurality of soft components, wherein, in the event that soft (software) components are extracted from the database storage section and are combined together to thereby generate a file, a comment indicative of a storage location in the database storage section for storing a respective soft component extracted from the database storage section is added to the respective soft component. The automatic software configuring system includes a device for identifying the respective soft component combined into the file and a storage location of the respective soft component in the database storage section by reading the comment; a device for identifying a comparison-target soft component stored in the database storage section for comparison with the respective soft component combined into the file in accordance with the storage location; a device for identifying a soft component having a different content by comparing the respective soft component combined into the file and the comparison-target soft component; and a device for replacing specified soft component in the database storage section with the soft component combined into the file.

It is preferable that the automatic software configuring system further includes a device for identifying the respective soft component combined into the file and storage location of the respective soft component in the database storage section by reading comments added front and rear portions of the respective soft component.

Further, it is preferable that the automatic software configuring system further includes a device for replacing a specified soft component in the database storage section with the soft component combined into the file in accordance with a request from the outside.

Further, it is preferable that the automatic software configuring system further includes a device for adding the respective soft component combined into the file to a new storage location specified from the outside in the database storage section.

Further, it is preferable that the database storage section stores therein a plurality of soft components in the form of a tree structure; the comment is added by using a path in the tree structure as a notation for indicating the storage location of the respective soft component in the database storage section; and the automatic software configuring system further includes a device for identifying the storage locations of the respective soft component combined into the file and the respective soft component in the database storage section by reading the comment added by using the notation.

Further, it is preferable that the database storage section adds an ID (identifier) uniquely identifiable to the respective soft component stored therein; the comment is added by using the ID as information indicative of the storage location of the respective soft component in the database storage section; and the automatic software configuring system further includes a device for identifying the storage locations of the respective soft component combined into the file and the respective soft component in the database storage section by reading the comment added by using the ID.

Further, it is preferable that a soft component having a sibling relation with a soft component stored in the storage location is included as a comparison-target soft component.

Further, it is preferable that the automatic software configuring system further includes a device for replacing a specified soft component in the database storage section with the soft component to which the comment is added when information specifying replacement is contained in the read comment.

Further, it is preferable that the automatic software configuring system further includes a device for adding the soft component combined into the file containing the comment as a new software component to a specified new storage location in the database storage section when information specifying new addition is contained in the read comment.

Further, in order to achieve the object described above, according to another aspect of the present invention, there is provided an automatic software configuring system including a database storage section for storing therein a plurality of soft components, wherein, in the event that soft components are extracted from the database storage section and are combined together to thereby generate a file, a comment indicative of a storage location in the database storage section for storing a respective soft component extracted from the database storage section is added to the respective soft component. The automatic software configuring system includes a device for identifying the respective soft component combined into the file and a storage location of the respective soft component in the database storage section by reading the comment; a device for identifying a comparison-target soft component stored in the database storage section for comparison with the respective soft component combined into the file in accordance with the storage location; a device for identifying a soft component having a different content by comparing the respective soft component combined into the file and the comparison-target soft component; and a device for replacing the respective soft component combined into the file with a specified soft component in the database storage section.

It is preferable that the database storage section stores therein a plurality of soft components in the form of a tree structure; the comment is added by using a path in the tree structure as a notation for indicating the storage location of the respective soft component in the database storage section; and the automatic software configuring system further includes a device for identifying the storage locations of the respective soft component combined into the file and the respective soft component in the database storage section by reading the comment added by using the notation.

Further, it is preferable that the database storage section adds an ID (identifier) uniquely identifiable to the respective soft component stored therein; the comment is added by using the ID as information indicative of the storage location of the respective soft component in the database storage section; and the automatic software configuring system further includes a device for identifying the storage locations of the respective soft component combined into the file and the respective soft component in the database storage section by reading the comment added by using the ID.

Further, it is preferable that a soft component having a sibling relation with a soft component stored in the storage location is included as a comparison-target soft component.

Further, it is preferable that the automatic software configuring system further includes a device for replacing a specified soft component in the database storage section with the soft component to which the comment is added when information specifying replacement is contained in the read comment.

Further, it is preferable that the automatic software configuring system further includes a device for adding the soft component combined into the file containing the comment as a new software component to a specified new storage location in the database storage section when information specifying new addition is contained in the read comment.

According to the configuration of the present invention, even in the event of automatically generating a source code of a new program by combining only necessary soft components extracted from a soft component database, the presence or absence of a change made to the automatically generated source code, a soft component in which the change is made, and the storage location of a corresponding soft component in a database storage section can easily be identified.

As a consequence, even in the case where the number of soft components is increased, the maintenance operation for the database storage section storing soft components can be facilitated.

BRIEF DESCRIPTION OF THE DRAWINGS

The invention is further described with reference to the accompanying drawings in which:

FIG. 4 is an example of the contents of FIG. 3 represented in XML;

FIG. 5 is an example of the contents of FIG. 3 implemented in the form of a table of a relational database;

FIG. 6 is a prototype file "/src/Sensors/Weight/Weight.c" in the case of using "Velocity";

FIG. 7 is an example source file generated by the automatic software configuring system from the soft component database shown in FIG. 4;

FIG. 8 is an example source file generated by the automatic software configuring system from the soft component database shown in FIG. 5;

FIG. 9 is an example in which a correction is applied to the source file shown in FIG. 7;

FIG. 14 is an example source file corrected by the automatic software configuring system in the case where the soft component in the generated source file, which is different from the intra-soft component database soft component, is added as a new software component to the soft component database;

FIG. 16 is an example in which an instruction for instructing the automatic software configuring system to incorporate the contents of the soft component in the generated source file, which is different from the intra-soft component database soft component, into the intra-soft component database soft component is added into an annotation in the generated source file; and FIG. 17 is an example in which an instruction for instructing the automatic software configuring system to add the soft component in the generated source file, which is different from the intra-soft component database soft component, to the intra-soft component database as a new software component into an annotation in the generated source file.

DETAILED DESCRIPTION OF THE PREFERRED EMBODIMENTS

Embodiments of the present invention will be described below with reference to the accompanying drawings.

In description herebelow, a soft component stored in a soft component database will be referred to as a "DB soft component." In addition, a soft component contained in a source file generated by the automatic software configuring system will be referred to as a "derived soft component."

Figure 1:
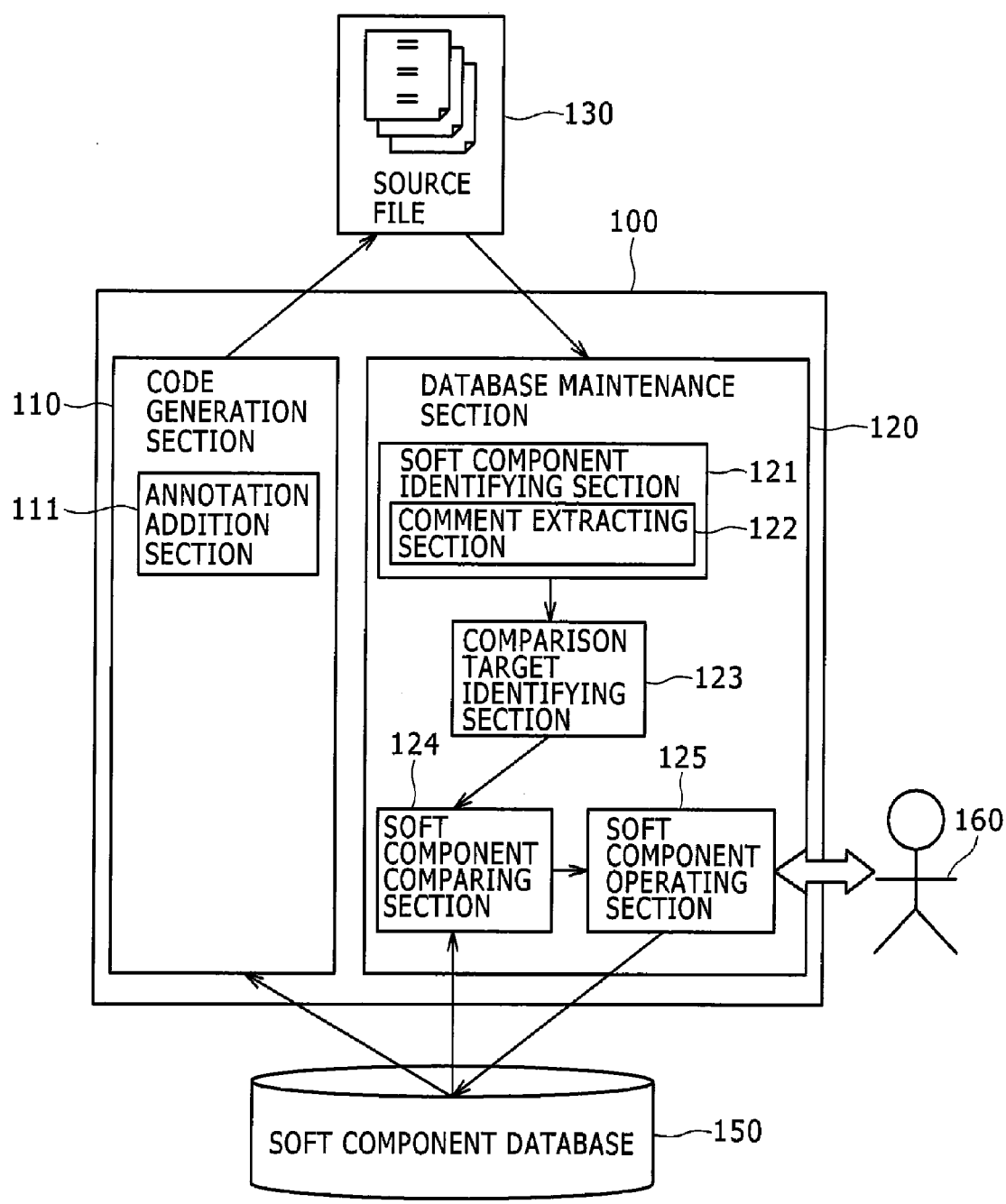
FIG. 1 is a functional block diagram of an automatic software configuring system.
Figure 2:
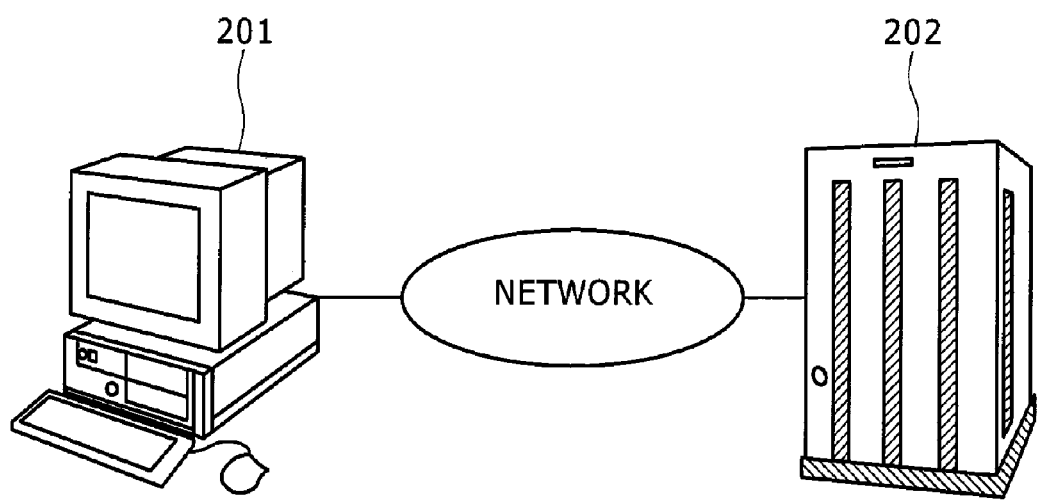
FIG. 2 is an example system configuration of the automatic software configuring system.

FIG. 1 is a functional block diagram of an automatic software configuring system of one embodiment of the present invention. The automatic software configuring system is configured to include an automatic configuring section 100 and a soft component database 150. The automatic configuring section 100 is configured to include a code generation section 110 and a database maintenance section 120. FIG. 2 is a view showing one example hardware configuration of the embodiment of the present invention.

According to the example of the present embodiment, the automatic configuring section 100 and also the database maintenance section 120, which are shown in FIG. 1, are disposed in a computer 201 (see FIG. 2) including a central processing unit (CPU) (not shown). The component database 150 is disposed in a server 203 connected via a network such as the Internet. Alternatively, however, for example, the automatic configuring section 100 and the soft component database 150 are disposed in the same computer. Still alternatively, the respective code generation section 110 and database maintenance section 120 in the automatic configuring section 100 may be disposed in computers different from one another.

Figure 3:
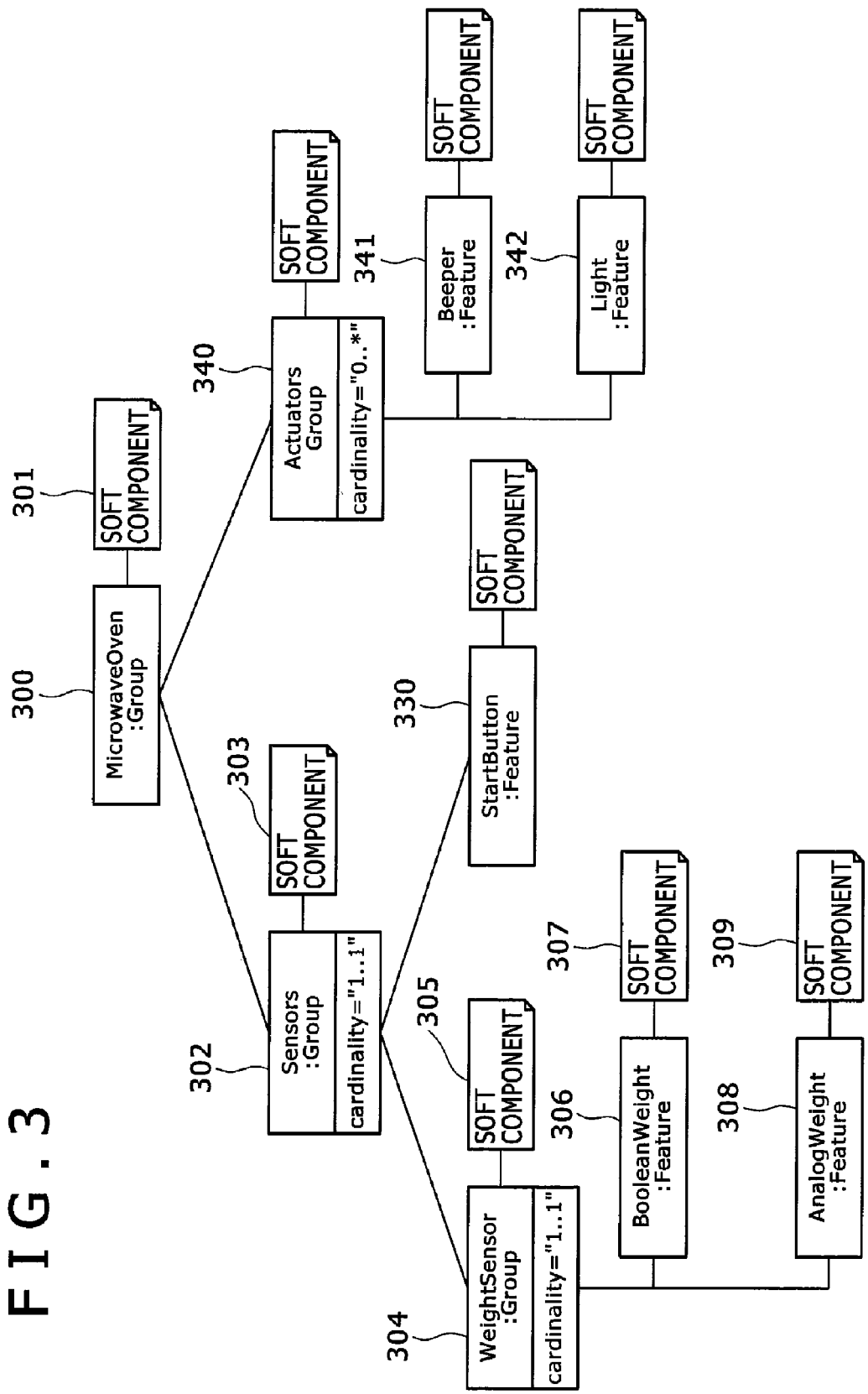
FIG. 3 is an example soft component database structured in the form of a logical tree.

Multiple soft components are stored in the soft component database 150. Here, the soft component represents a source file or partial source code character string. In the soft component database 150, all soft components are managed in a single tree. FIG. 3 is a view showing an example tree that is managed in the soft component database 150. FIG. 4 is a view showing an example in which the tree shown in FIG. 3 is described by use of Extensible Markup Language (XML), which is a markup language that enables users to uniquely define tags. The markup language may be not only XML, but may be any one of markup languages, such as SGML (Standard Generalized Markup Language), for tag description. The soft component database 150 may be realized by the use of a relational database. FIG. 5 is a view showing an example in which the tree shown in FIG. 3 is managed by use of a relational database.

The automatic configuring section 100 is configured to include the code generation section 110 and the database maintenance section 120. The code generation section 110 includes a comment adding section 111. The code generation section 110 extracts from the soft component database 150, soft components necessary for automatically generate a new program. Then, as shown in FIG. 7, by using an comment addition section 111, the code generation section 110 adds information of storage locations in the soft component database 150 as comments in front and rear portions of the respective extracted soft component. Then, the code generation section 110 appropriately couples the soft components together and outputs as a compilable source file. In the comments to be added in the front and rear portions of the respective soft component, as shown in FIG. 7, the information of storage location may be included in any one of the front and rear portions. Alternatively, as in the case of a respective soft component 701, 702, in the case where each derived soft component is all time continually combined in a source file, a comment does not necessarily have to be added to the end of the derived soft component. For example, even in the case where comments 713 and 723, respectively, are not added, derived soft components 712 and 722 can be identified by using only comments 711 and 721. However, when the derived soft components are not continually combined with one another in the source file, the comments are added to the front and rear portions of the soft components, whereby a soft component identifying section 121 can easily identify the range of the combined soft components. For the code generation section 110 to specify soft components desired for extraction from the soft component database 150, various methods can be contemplated. The methods include, for example, a method of receiving a specification of the soft components a user via a GUI (graphical user interface), and a method of receiving a file containing information specifying the soft components.

The database maintenance section 120 is configured to include a soft component identifying section 121, a comparison target identifying section 123, a soft component comparing section 124, and a soft component operating section 125.

The soft component identifying section 121 includes a comment extracting section 122, and operates as follows. In response to an input source file 130, comments such as described above are extracted by use of the comment extracting section 122. Thereby, with the comments being used, derived soft components (the range thereof) contained in the source file 130 are identified. Then, the derived soft components and the information of storage location contained in the comments added to the derived soft components are output to the comparison target identifying section 123.

In accordance with the input information of storage location, the comparison target identifying section 123 operates as follows. Among the DB soft components stored in the soft component database 150, a respective DB soft component to be compared with the respective derived soft component, which has been input, are identified. Then, the derived soft component and the DB soft component, which have been identified as the comparison targets, are output to the soft component comparing section 124.

The soft component comparing section 124 operates as follows. A comparison is performed between the content of the derived soft component and the content of the DB soft component. In the event that a differential portion is detected, the derived soft component, the DB soft component, the information of storage location, and the differential portion are output to the soft component operating section 125.

The soft component operating section 125 operates as follows. With regard to the soft components input from the soft component comparing section 124 and different in the contents, in accordance with a specified operation policy, the DB soft component stored in the soft component database 150 is replaced with the derived soft component. Alternatively, the derived soft component is added as a new DB soft component to the soft component database 150. In this case, it is contemplated that the operation policy of the soft component operating section 125 to be specified is determined in any of the following methods, for example. One method is that the operation policy is received from a user 160 via the GUI. Another method is that, in the event that a derived soft component is corrected, information specifying the policy is added into the comment added to the derived soft component, whereby the information is extracted by the comment extracting section 122 and is output to the soft component operating section 125.

The individual sections of the automatic software configuring system of the present embodiment of the present invention will be described in more detail herebelow.

FIG. 3 is example soft components stored in the soft component database 150 shown in the form of a logical tree. FIG. 4 is an example of the logical tree of FIG. 3 described in XML. For the sake of spacing, FIG. 4 shows XML strings corresponding to nodes 300 to 309 of the logical tree shown in FIG. 3.

In FIG. 4, <Group> and <Feature> tags form the tree structure. The <Group> tag is used to group the soft components. For example, in FIG. 3, the node 300 corresponds to a <Group> tag 400 that defines an oven range system named "Microwave Oven" itself. More specifically, this indicates a group defining that descendant nodes of the node 300 in the tree in FIG. 3 are all soft components relevant to the oven range system. Further, nodes 302 and 340, respectively, indicate that soft components relative to the oven range system are grouped into "Sensors" and "Actuators."

As shown in FIG. 4, introducing <sub Groups> tags enables the representation of a nested structure of the <Group> tags. Further, nodes 330, 341, and 342 define that soft components "Weight Sensor" and "Start Button" belong to a group "Sensors," and soft components "Beeper" and "Light" belong to a group "Actuators."

The <Feature> tag defines options for a soft component necessary to automatically generate a new program. For example, in FIG. 3, "Boolean Weight" and "Analog Weight" are defined with the nodes 304, 306, and 308 for a group "Weight Sensor." Thereby, a definition is made to permit any one of the soft components "Boolean Weight" and "Analog Weight" to be selectable as the soft component "Weight Sensor" necessary to generate a new program from the soft component database 150. More specifically, the node 306 corresponds to a <Feature> tag 405 in FIG. 4, and the tag defines soft a component relevant to a weight sensor "Boolean Weight." In accordance with the <Feature> tag, the soft component "Boolean Weight" among weight sensors is defined as one option. Further, the node 308 corresponds to a <Feature> tag 408, and the tag defines a soft component relevant to a weight sensor "Analog Weight." In accordance with the <Feature> tag, the soft component "Analog Weight" among the weight sensor is defined as one option.

The number of simultaneously selectable options among multiple options defined in accordance with the <Feature> tag is defined by using an attribute "cardinality." When cardinality="1..1", one option has to be necessarily selected; and when cardinality="0..*," it is defined that 0 or more options can be selected. For example, with reference to FIG. 3, it is specified as cardinality="1..1" for the node 304. Hence, any one of the node 306 "Boolean Weight" and the node 308 "Analog Weight" has to be necessarily selected.

A portion interposed between a <src> tag and a </src> tag indicates a soft component itself. The portion between the <src> and </src> tags permits the insertion of a <File> tag and <Text> tag. A portion interposed between a <File> tag and </File> tag indicates a source code file itself, which contains a source code description, as a soft component. A portion interposed between a <Text> tag a </Text> tag indicates a character string corresponding to a partial source code and a file pathname for insertion of the character string as a soft component. Hence, for example, in FIG. 4, a file "/src/Sensors/Weight/Weight.h" containing the source code description is indicated as a soft component in a <src> tag 405 directly under a <Group> tag 404. Further, in a <src> tag 407 directly under a <Feature> tag 406, there is indicated a soft component in which a file pathname for inserting a source code character string is "/src/Sensors/Weight/Weight.c" and the source code character string to be inserted is "void init Weight ( ) { . . . }." As described above, by introducing the <File> tag and the <Text> tag, the code generation section 110 is enabled to discriminately process an item handling a file itself as a soft component and an item handling a source code character string as a soft component.

The tree to be managed by the soft component database 150 may be of any type inasmuch as the tree is logically single. Alternatively, the tree may be of the type formed such that a partial tree thereof is described in each of multiple XML files.

FIG. 5 is an example in which the tree structure of FIG. 3 is implemented in the form of a table of a relational database. Uniquely identifiable IDs are allocated to the respective soft components configuring the tree. In the relational database, the IDs are used as primary keys that uniquely identify the respective rows.

The code generation section 110 operates as follows. Soft components necessary to generate a source file of a new program are extracted from the soft component database 150 and are combined together as the source file. A combining method therefor can be of the type in which a prototype of the source file is prepared, and the soft components are inserted thereinto. FIG. 6 is a view showing a prototype file "/src/Sensors/Weight/Weight.c" as an insertion file in the case where "Velocity" (http://jakarta.apache.org/velocity/), which is a template engine, is used. For example, as shown in FIG. 6, in "Velocity," soft component insertion location are defined as "$init Weight" and "$get Weight."

FIG. 7 is a view showing the content of the source file "/src/Weight/Weight.c" generated by the code generation section 110 in accordance with the soft component database 150 implemented by use of XML. This example shows the case where a soft component 308 has been selected in FIG. 3. The code generation section 110 extracts partial source code blocks 420 and 421 contained in <Text> tags 409 and 410 shown as soft components in FIG. 4. In FIG. 7, codes (files) 712 and 722, respectively, correspond to the source code blocks 420 and 421.

Subsequently, the comment addition section 111 of the code generation section 110 adds comments containing information indicative of the storage locations of the extracted soft components in the soft component database 150 to front and rear portions of the source code blocks 420 and 421. In FIG. 7, comments 711 and 713 and comments 721 and 723, respectively, correspond to the comments added by the comment addition section 111 to the front and rear portions of the source code blocks 420 and 421. In this example, since the tree structure is described in XML, the comment addition section 111 adds the comments by representing the storage locations by using XPath (name) and by using comments.

Further, the comment addition section 111 indicates the range of the software components by adding "@begin" and "@end" at the first and last portion of the soft component, respectively. As a consequence, in the case of FIG. 7, the source code blocks to be inserted into the prototype files are formed as source code blocks 701 and 702. Finally, the code generation section 110 identifies a prototype file in accordance with a path attribute contained in the <Text> tag, then inserts the respective source code blocks 701 and 702 into insertion locations "$init Weight" and "$get Weight" in FIG. 5, and then outputs as a source file "/src/Weight/Weight.c."

FIG. 8 is a view showing the content of the file "/src/Weight/Weight.c" generated by the code generation section 110. This file is generated in the case where, similarly as in the case of FIG. 7, the node 308 in FIG. 3 has been selected as a soft component necessary to generate a source file of a new program, while the relational database shown in FIG. 5 is used as the soft component database 150. Different from the case of FIG. 7, in the case where the relational database is used, as in respective comments 811 and 821, soft component IDs as shown in FIG. 5 are used as information inclusive of the comments and indicative of the storage locations.

The database maintenance section 120 will be described herebelow in more detail with reference to an example case where the soft component database 150 is implemented by use of XML descriptions shown in FIG. 4. Even in the case of the soft component database 150 using the relational database shown in FIG. 5, the database maintenance section 120 can be implemented in a manner similar to a manner described herebelow.

The database maintenance section 120 is configured to include the soft component identifying section 121, the comparison target identifying section 123, the soft component comparing section 124, and the soft component operating section 125. The soft component identifying section 121 includes the comment extracting section 122, and inputs a source file 130 generated in the past by the code generation section 110. In this case, the database maintenance section 120 will be described in detail with reference to the case where a source file shown in FIG. 9 is input. The source file has been generated by the code generation section 110 to have the content shown in FIG. 7 in accordance with the soft component database 150 having the content shown in FIG. 4. Further, the source file has been corrected as in the case where the code (file) 712 has been corrected to a code (file) 912 in the course of completing products in accordance with the source file.

In the database maintenance section 120, when the source file shown in FIG. 9 is input, the soft component identifying section 121 first identifies a derived soft component contained in the source file. Hence, the comment extracting section 122 extracts comments 911 and 913 and comments 921 and 923 contained in the source file. More specifically, the comment extracting section 122 directs attention to comments contained in the source file, determines a respective character string block containing "@begin" or "@end" to be a comment, and extracts the comment. Then, the soft component identifying section 121 selects, as a derived soft component, a respective character string interposed between the comment inclusive of "@begin" and a comment inclusive of "@end." As a consequence, code blocks 912 and 922 shown in FIG. 9 are, respectively, extracted as derived soft components.

Subsequently, the comparison target identifying section 123 performs operation as follows. The soft component storage location information contained in the respective comment is interpreted. Thereby, the storage location in the soft component database 150 for a DB soft component corresponding to the respective derived soft component identified by the soft component identifying section 121 is identified.

The comparison target identifying section 123 performs the following operation. The operation determines the DB soft component, which is stored in the storage location, to be a comparison target for comparison with the derived soft component, and then outputs to the soft component comparing section 124. In the present example case, the comparison target identifying section 123 analyzes or parses XPath contained in the respective comments 911 and 921. Thereby, the tags 409 and 410 (in FIG. 4) are, respectively, identified to be the storage locations, and the character string blocks 420 and 421 interposed by the tags 409 and 410 are identified to be comparison target DB soft components.

The DB soft component to be identified by the comparison target identifying section 123 to be the comparison target for comparison with the derived soft component is not limited to that stored in the storage location. Alternatively, however, a DB soft component having a sibling relation with the above-described DB soft component in the tree structure of the soft component database 150 can be identified. For example, in FIG. 3, the DB soft component having the sibling relation with a DB soft component 309 stored in a storage location corresponding to the above-described storage location corresponds to a DB soft component 307. The DB soft component 307 can be included as a comparison targets for comparison with the derived soft component. Thereby, when the content of correction of the derived soft component as shown in FIG. 9 matches with the content a DB soft component different from the resultantly corresponding DB soft component, a problem can be prevented in that the derived soft component is erroneously added as a new DB soft component into the soft component database 150 to overlap with the DB soft component.

Subsequently, the soft component comparing section 124 performs a comparison the content of the derived soft component with the content of the DB soft component. The soft component operating section 125 displays the result of the comparison performed by the soft component comparing section 124 on an example screen shown in FIG. 10. Thereby, the location of a DB soft component different from a derived soft component is presented to the user 160. In the example shown in FIG. 10, a rectangle 1001 corresponding to a option "Analog Weight" is displayed in a color different from others. This indicates that the content of the DB soft component belonging to the option is different from the content of the corresponding derived soft component.

Figure 10:
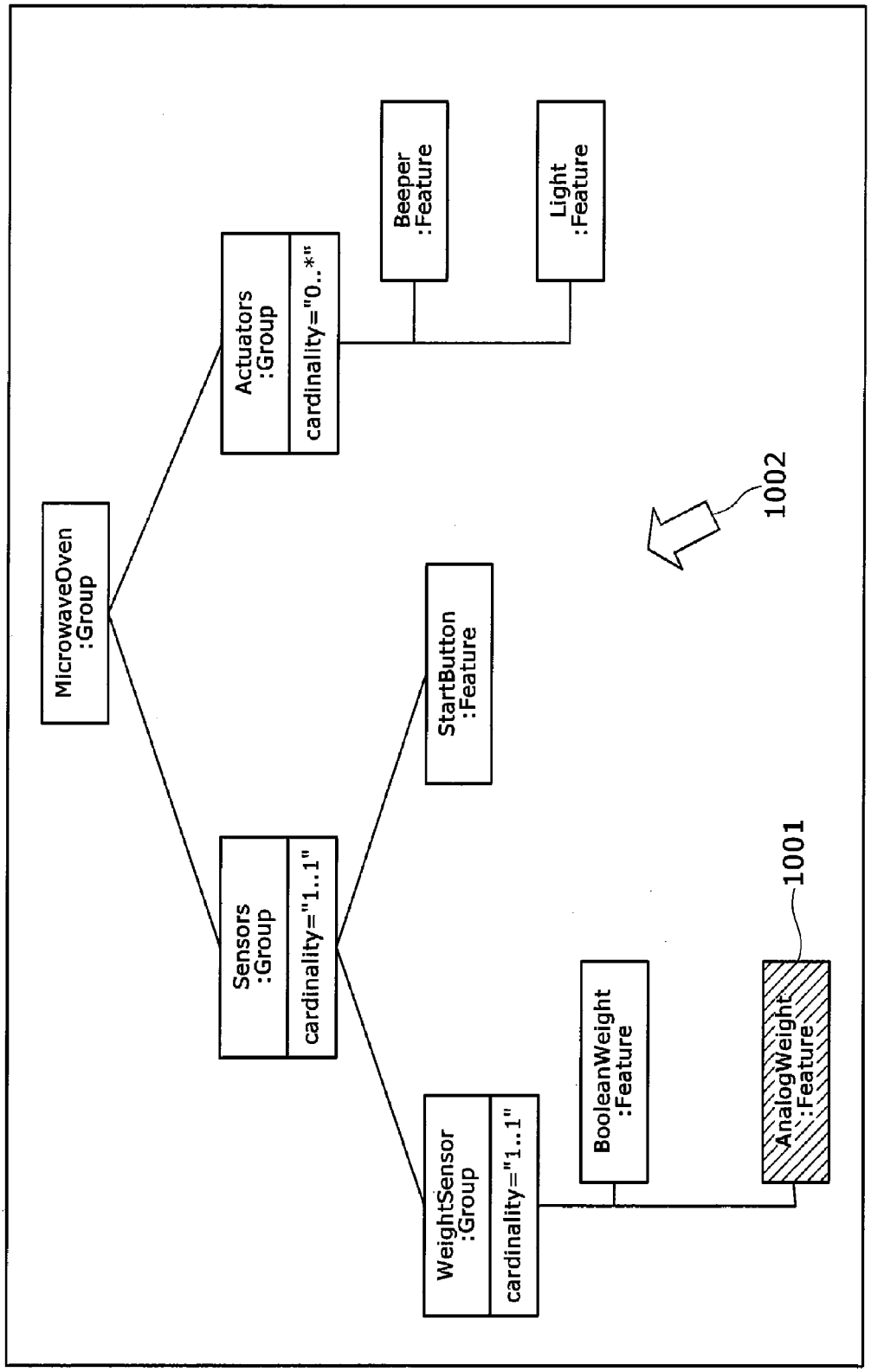
FIG. 10 is an example of an example GUI screen of the automatic software configuring system, in which the screen displays a different portion from the source file generated in the soft component database.

The database maintenance section 120 performs comparisons of the contents of all source files 130 with DB soft components in the manner described above. Thereby, through display of the screen as shown in FIG. 10, all storage locations of the DB soft components each having a different content can be presented to the user 160.

Figures 11, 12:
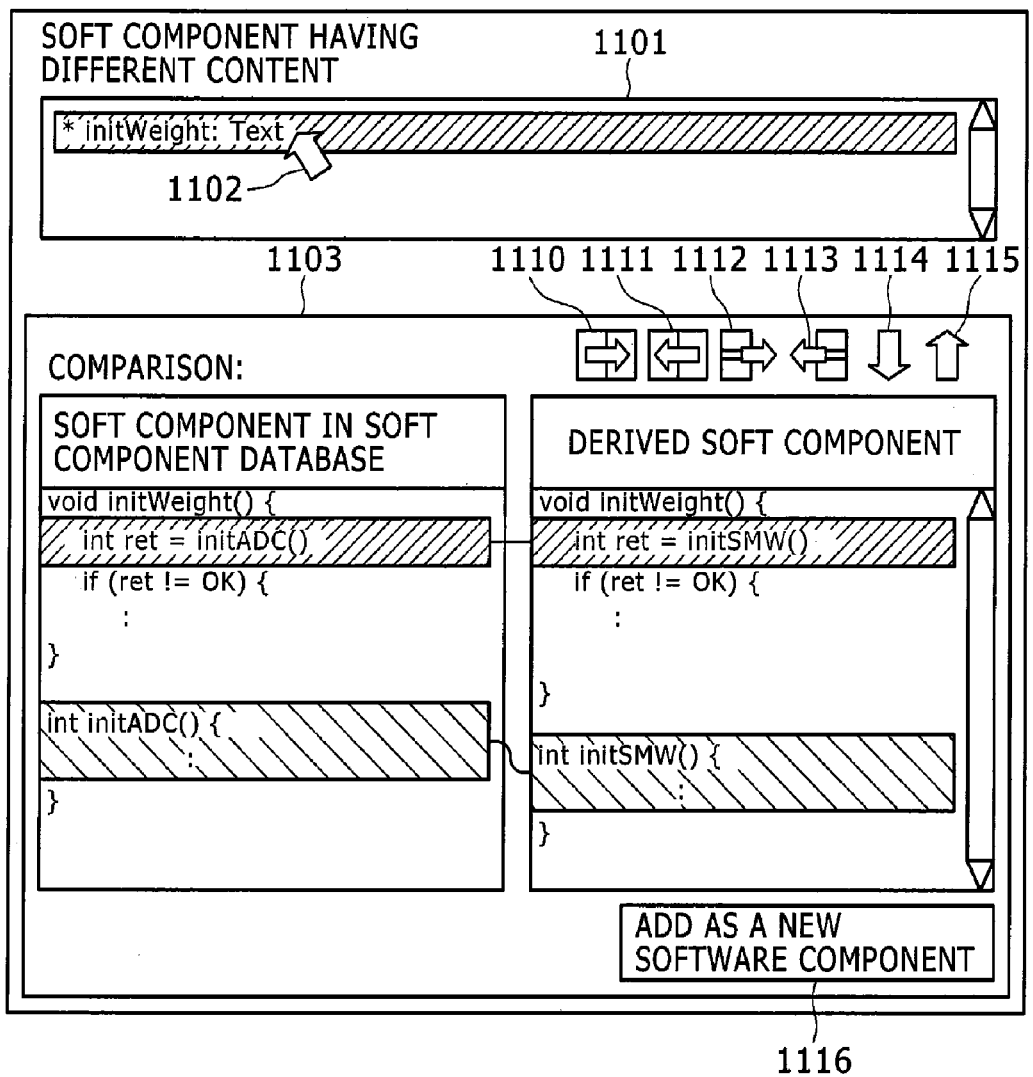
FIG. 11 is an example GUI screen of the automatic software configuring system, in which the screen displays detail of a differential between a soft component in the soft component database (or, "intra-soft component database soft component," herebelow) and a soft component in the generated source file, and receives a relative reflection of the differential.
FIG. 12 is an example GUI screen of the automatic software configuring system in the case where the soft component in the generated source file, which is different from the intra-soft component database soft component, is added as a new software component to the soft component database.

Operation on the screen shown in FIG. 10 will be described herebelow. When the user 160 clicks or double clicks on the rectangle 1001 by using a mouse pointer 1002, a screen as shown in FIG. 11 is displayed by the soft component operating section 125. Thereby, detail of the comparison result is displayed on the screen. More specifically, with reference to FIG. 11, among DB soft components belonging to an option corresponding to the rectangle 1001, DB soft components different having the contents different from the contents of corresponding derived soft components are displayed in the form of a list in a list box 1101. When the user 160 clicks or double clicks on any one of the soft components in the list by using the mouse pointer 1002, a detailed differential of a corresponding soft component is displayed in a field 1103. In the field 1103, the content of the selected DB soft component is displayed on the left side, and the corresponding derived soft component is displayed on the right side. A portion of the content different is display in a color different from a color of the background.

When a button 1110 is depressed, the content of the derived soft component is overwritten overall with the content of the DB soft component. Alternately, when a button 1111 is depressed, the content of the DB soft component DB is overwritten overall with the content of the derived soft component. When a button 1112 is depressed, the content of the derived soft component is overwritten with the content of the DB soft component only for a differential portion currently being selected. Alternatively, when a button 1113 is depressed, the content of the DB soft component is overwritten with the content of the derived soft component only for a differential portion currently being selected.

As described above, since the buttons 1110 and 1112 are used, in the event that a source file of a new program has been generated by the code generation section 110, and then the content of the corresponding DB soft component is updated, the content of the update can be reflectively incorporated into the source file 130. Alternatively, since the buttons 1111 and 1113 are used, in the event that a source file of a new program has been generated by the code generation section 110, and then the derived soft component corrected, the content of the correction can be reflectively incorporated into a corresponding DB soft component. When buttons 1114 and 1115 are depressed, other differential portions can be selected.

As described above, the differential portion described above can be reflectively incorporated into the soft component stored in the soft component database 150. Further, the derived soft component inclusive of the differential portion can be added as a new DB soft component to the soft component database 150. With a button 1116 provided, the soft component operating section 125 enables the addition of the derived soft component as the new software component. When the button 1116 is depressed, a dialog as shown in FIG. 12 is displayed, in which input of a new node name (Feature) to which the new software component belongs is allowed to be received. When the Feature name is input and an OK button is depressed, the node is added to a position corresponding to a sibling to which a DB soft component corresponding to a derived soft component, and the derived soft component is stored as a DB soft component corresponding to the node.

Figure 13:
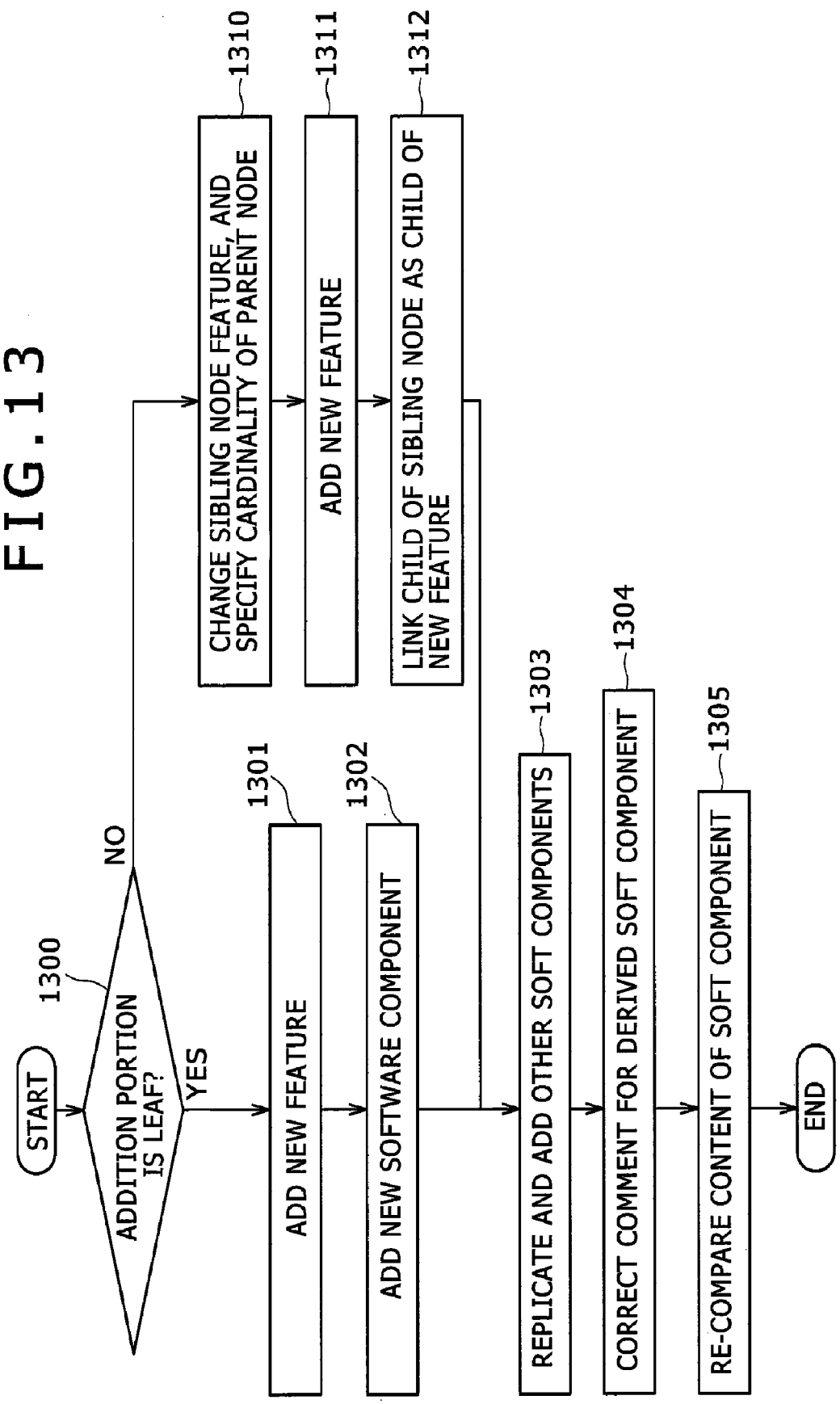
FIG. 13 is a processing flow in the automatic software configuring system in the case where the soft component in the generated source file, which is different from the intra-soft component database soft component, is added as a new software component to the soft component database.

FIG. 13 is a flow of processing of the soft component operating section 125 in the case where a <Feature> name has been input and the OK button has been depressed in the dialog shown in FIG. 12.

First, at step 1300, it is checked whether a node to which a DB soft component corresponding to a derived soft component to be added as a new software component belongs corresponds to a leaf in the tree structure of the soft component database 150. For example, in FIG. 10, a node "Analog Weight" corresponding to the rectangle 1001 corresponds to the leaf. If the node corresponding to the leaf, then at step 1301 the node having the input <Feature> name is added as a new node to the position corresponding to a sibling of the node to which the DB soft component belongs.

Then, at step 1302, the derived soft component is added as a DB soft component.

Then, at step 1303, other DB soft components belonging to the node to which the above-described DB soft component belongs are all replicated, and the DB soft components are added as DB soft components belonging to the added new node.

Then, at step 1304, information of storage locations contained in comments added to the derived soft component and derived soft components corresponding to the replicated DB soft components are corrected to XPath indicative of the location of the DB soft component corresponding to the newly added DB soft component.

FIG. 14 is a view showing the content of a source file containing a derived soft component in the case where the derived soft component 912 shown in FIG. 9 is added as a new software component to the soft component database 150 by specifying "Digital Weight" for the <Feature> name. In FIG. 14, a derived soft component 1412 corresponds to the derived soft component 912. At step 1304, the comment 911 is corrected as a comment 1411. As described above, the storage location corresponding to the sibling becomes the new storage location with respect to the storage location of the conventional DB soft component. Hence, as shown in FIG. 14, the name attribute of the <Feature> tag corresponding to a direct parent of the <Text> tag can be changed to the Feature name.

At step 1304, a correction is made also for a derived soft component other than the derived soft component added as the new software component. More specifically, the correction is made to the information of storage location contained in the comment added to the derived soft component added to the derived soft component belonging to the same node as the derived soft component added as the new software component. For example, in FIG. 14, also a comment 1421 of a derived soft component 1422 is corrected. Thereby, in the case where the Feature name "Digital Weight" is selected, the correction is made to the same content as the source file generated by the code generation section 110. Finally, at step 1305, the content of the newly added DB soft components and the contents of the derived soft components corresponding to the corrected comment, and a screen similar to that of FIG. 10 are displayed. Thereby, when, in addition to the derived soft component added this time as the new DB soft component, there is a derived soft component different in the content from the contents of the DB soft components, the difference can be iteratively identified and incorporated.

Figure 15A:
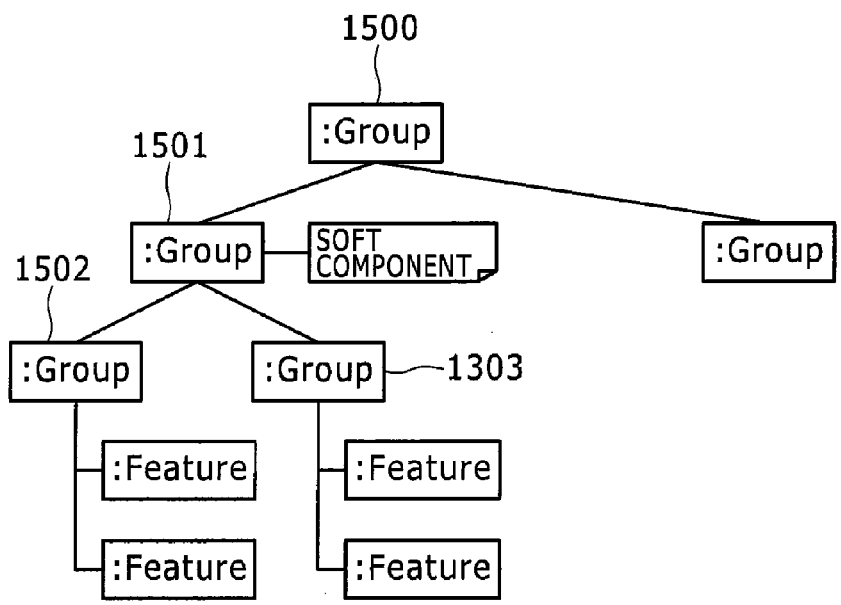
FIG. 15 includes FIGS. 15(*a*) and 15(*b*) showing the contents of changes in the soft component database in the case where the soft component in the generated source file, which is different from the intra-soft component database soft component, is added as a new software component to the soft component database.

If, at step 1300, the node to which the DB soft component corresponding to the derived soft component to be added as a new software component does not correspond to the leaf, then the operation shifts or moves to step 1310. This is exemplified in FIG. 15 that shows a soft component database having the content different from that shown in FIG. 3. In the exemplified database, a node 1500 does not correspond to the leaf. In this case, at step 1310, when the name of the node belonging to the DB soft component is "Group," it is changed to "Feature," and the attribute "cardinality" of a parent of the node is set to "1..1" when it has been unset.

Subsequently, at step 1311, a node having the input Feature name is added as a new Feature node to the position corresponding to the sibling.

Then, at step 1312, a link is established from the added new node to a child to which a DB soft component corresponding to a derived soft component to be added as a new software component. Thereby, the child can be handled as a child of the new option without being replicated.

Upon termination of step 1312, the steps subsequent to step 1303 are executed. A tree structure of the soft component database 150 shown in FIG. 15(b) indicates a case where, in a tree structure shown in FIG. 15(a), a derived soft component corresponding to a DB soft component belonging to the node 1501 is added as new software component to the soft component database 150.

Figure 15B:
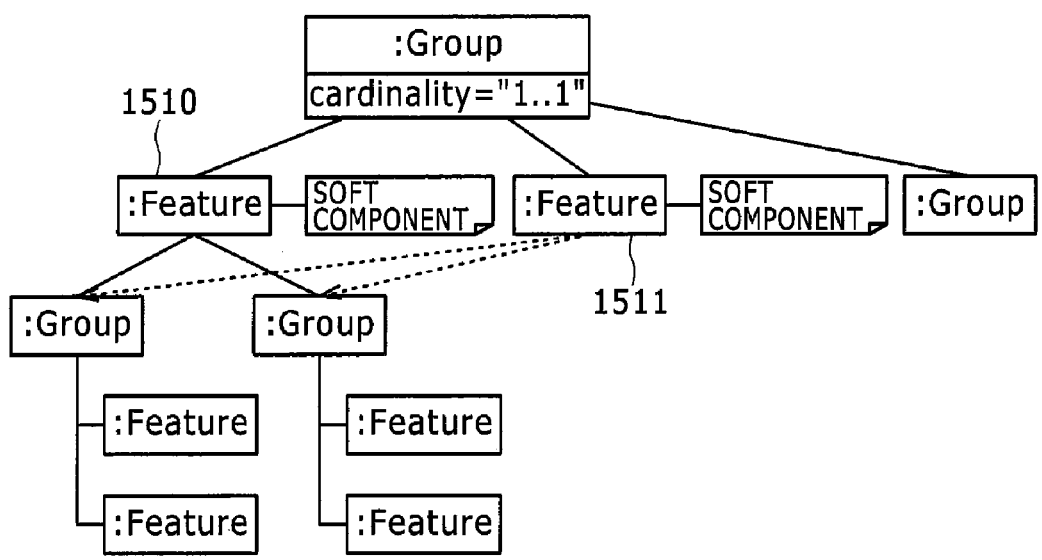

As shown in FIG. 15(b), at step 1310, the node name of the node 1501 is changed to "Feature" (1510) and the attribute "cardinality" is set to "1..1". Then, at step 1311, a node 1511 to which the new software component belongs is added to a position corresponding to a sibling of the node 1510, as shown in FIG. 15(b).

Then, at step 1312, a link is established from the node 1511 to child nodes 1501 to 1503. Thereafter, steps 1303 to 1305 are executed as described above, and as a consequence, the tree structure as shown in FIG. 15(b) is formed.

Thus, the soft component operating section 125 displays the screen as shown in FIG. 11, and then operations as follows. For example, in accordance with the content of operation performed by the user 160, the soft component operating section 125 causes relative incorporation of the differential portion between the content of a DB soft component and the content of a corresponding derived soft component, and adds a derived soft component a new DB soft component to the soft component database 150. However, the soft component operating section 125 is capable of performing these operations, but is also capable of operating in accordance with an instruction contained in the comment added to the derived soft component.

FIG. 16 is a view showing a source file generated in the past by the code generation section 110 to have the content shown in FIG. 7, in which the code block 712 is corrected as a code block 1612. A mark 1620 ("@replace") is added to a comment 1611. In the event that the source file shown in FIG. 16 is input, when extracting the comment 1611, the comment extracting section 122 verifies that the mark 1620 is included, and outputs the verification result to the soft component operating section 125 in association with a derived soft component to which the comment is added. Then, without displaying any of screens such as those shown in FIGS. 10 and 11, the soft component operating section 125 incorporates the differential portion between the derived soft component and the corresponding DB soft component into the DB soft component. However, the soft component operating section 125 can operate in the following manner. A screen such as shown in FIG. 10 is displayed. On the screen, there is displayed the location of a DB soft component having the content different from the content of a corresponding derived soft component. Using the screen, the user 160 clicks or double clicks on the rectangle 1001 and thereby causes displaying a dialog permitting verification of whether to incorporate the differential portion between the derived soft component and the corresponding DB soft component.

FIG. 17 is a view showing a source file generated in the past by the code generation section 110 to have the content shown in FIG. 7, in which the code block 712 is corrected as a code block 1712. A mark 1720 ("@add") is added to a comment 1711. Similar to the case of FIG. 16, the comment extracting section 122 verifies the mark 1720, and outputs, together with XPath contained in the mark 1720, the verification result to the soft component operating section 125 in association with a derived soft component to which the comment including the mark 1720 is added. Then, without displaying any of screens such as those shown in FIGS. 10 and 11, the soft component operating section 125 adds the derived soft component as a new DB soft component to the soft component database 150 in accordance with the flow shown in FIG. 13. However, the new Feature node for addition at step 1301 or 1311 is added to the storage location indicated in XPath. Similar to the case of FIG. 16, the soft component operating section 125 can operate in the following manner. A screen such as shown in FIG. 10 is displayed, and the location of a DB soft component having the content different from the content of a corresponding derived soft component is displayed thereon. Using the screen, the user 160 clicks or double clicks on the rectangle 1001 and thereby causes displaying, for example, a dialog permitting verification whether to add the derived soft component as a new DB soft component and displaying the location for adding the new Feature node in such a form of FIG. 10. Thereby, a dialog permitting verification of whether the location of addition is correct can be displayed.

INDUSTRIAL APPLICABILITY

Not only software products, various types of text documents having module structures can be stored into the soft component database 150, and a text file of a new document can be automatically configured in accordance with the stored text documents. Further, the techniques as described above can be adapted as well to devices of the type that performs maintenance management of such a database.

What is claimed is:

1. An automatic software configuring apparatus including a database storage means including executable instructions stored in a non-transitory computer-readable medium for storing therein a plurality of software components represented as source codes, wherein software components ("soft components," hereinbelow) extracted from the database storage means are combined together to generate a source file, the automatic software configuring apparatus comprising:

an annotation addition means for adding a comment indicative of a storage location in the database storage means to each soft component;

a soft component identifying means for identifying the respective soft component combined into the source file and a storage location of the respective soft component in the database storage means by reading the comment of the respective soft component;

a comparison target identifying means for identifying a comparison-target soft component stored in the database storage means for comparison with the respective soft component combined into the source file in accordance with the storage location;

a soft component comparing means for identifying a soft component having a different content by comparing the respective soft component combined into the source file and the comparison-target soft component; and a soft component operating means for replacing a specified soft component in the database storage means with the soft component having the different content in the source file, wherein the database storage means stores therein a plurality of soft components in the form of a tree structure;

the comment is added by using a path in the tree structure as a notation for indicating the storage location of the respective soft component in the database storage means; and the automatic software configuring system further comprises means for identifying the storage locations of the respective soft component combined into the source file and the respective soft component in the database storage means by reading the comment added by using the notation.

2. An automatic software configuring apparatus as defined in claim 1, further comprising means for identifying the respective soft component combined into the source file and storage location of the respective soft component in the database storage means by reading comments added front and rear portions of the respective soft component.

3. An automatic software configuring apparatus as defined in claim 1, further comprising means for replacing a specified soft component in the database storage means with the soft component combined into the file in accordance with a request from the outside.

4. An automatic software configuring apparatus as defined in claim 1, further comprising means for adding the respective soft component combined into the source file to a new storage location specified from the outside in the database storage means.

5. An automatic software configuring system apparatus as defined in claim 1, wherein the database storage means adds an ID (identifier) uniquely identifiable to the respective soft component stored therein;

the comment is added by using the ID as information indicative of the storage location of the respective soft component in the database storage means; and the automatic software configuring system further comprises means for identifying the storage locations of the respective soft component combined into the source file and the respective soft component in the database storage means by reading the comment added by using the ID.

6. An automatic software configuring apparatus as defined in claim 1, a soft component having a sibling relation with a soft component stored in the storage location is included as a comparison-target soft component.

7. An automatic software configuring apparatus as defined in claim 1, further comprising means for replacing a specified soft component in the database storage means with the soft component to which the comment is added when information specifying replacement is contained in the read comment.

8. An automatic software configuring apparatus as defined in claim 1, further comprising means for adding the soft component combined into the source file containing the comment as a new software component to a specified new storage location in the database storage means when information specifying new addition is contained in the read comment.

9. An automatic software configuring apparatus as defined in claim 1, further comprising means for replacing a specified soft component in the database storage means with the soft component to which the comment is added when information specifying replacement is contained in the read comment.

* * * * *